(12) United States Patent
Wittmann et al.

(10) Patent No.: US 12,269,727 B2
(45) Date of Patent: Apr. 8, 2025

(54) SYSTEM AND METHOD FOR OPERATING A SYSTEM FOR PRODUCING FILLED PLASTIC CONTAINERS FROM STERILE PLASTIC PREFORMS

(71) Applicant: KRONES AG, Neutraubling (DE)

(72) Inventors: Christian Wittmann, Hemau (DE); Michael Peter, Siegenburg (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 18/222,904

(22) Filed: Jul. 17, 2023

(65) Prior Publication Data

US 2024/0017980 A1 Jan. 18, 2024

(30) Foreign Application Priority Data

Jul. 15, 2022 (DE) ...................... 10 2022 117 725.4

(51) Int. Cl.
*B67C 7/00* (2006.01)
*B29C 49/42* (2006.01)
(Continued)

(52) U.S. Cl.
CPC ........ *B67C 7/004* (2013.01); *B29C 49/42065* (2022.05); *B29C 49/42418* (2022.05);
(Continued)

(58) Field of Classification Search
CPC . B67C 7/004; B67C 3/2642; B67C 2003/227; B29C 49/42418; B29C 49/42065
See application file for complete search history.

(56) References Cited

U.S. PATENT DOCUMENTS 3,782,066 A * 1/1974 Schmitt .................. B65B 3/003
53/412
4,076,071 A * 2/1978 Rosenkranz .......... B29B 13/023
392/432
(Continued)

FOREIGN PATENT DOCUMENTS

| DE | 102005015565 | 10/2006 | ............. B65B 35/04 |
|---|---|---|---|
| DE | 102009036922 | 2/2011 | ............. B29C 49/42 |
| DE | 102010022130 | 11/2011 | ............. B29C 49/46 |

OTHER PUBLICATIONS

Search Report issued in German Patent Appln. Serial No. 10 2022 117 725.4, dated Feb. 7, 2023, with machine English translation, 9 pages.

(Continued)

*Primary Examiner* — Lucas E. A. Palmer
(74) *Attorney, Agent, or Firm* — HAYES SOLOWAY P.C.

(57) ABSTRACT

A system for producing filled plastic containers from sterilized plastic preforms, includes a transport device for transporting the plastic preforms and plastic containers produced from the plastic preforms by forming, along a predetermined transport path through the system, a forming apparatus for forming the sterilized plastic preforms into plastic containers, and a filling apparatus for filling the plastic containers during their at least sectional transport substantially along a circular line about a central axis of the filling apparatus. The forming apparatus and the filling apparatus have a maximum distance from one another in relation to their respective central axes
of 5.5 m, preferably of 5.3 m, and the forming apparatus has a maximum number of 24 forming stations or
of 6.0 m, preferably of 5.6 m, and the forming apparatus has more than 24 forming stations.

15 Claims, 2 Drawing Sheets

(51) Int. Cl.
*B67C 3/22* (2006.01)
*B67C 3/26* (2006.01)
*B29L 31/00* (2006.01)

(52) U.S. Cl.
CPC ..... *B67C 3/2642* (2013.01); *B29L 2031/7158* (2013.01); *B67C 2003/227* (2013.01); *B67C 2007/006* (2013.01)

(56) References Cited

U.S. PATENT DOCUMENTS

| | | | | |
|---|---|---|---|---|
| 5,788,940 | A * | 8/1998 | Cicha | B65B 55/08 53/425 |
| 6,000,195 | A * | 12/1999 | Jakobsson | B65B 59/003 53/565 |
| 6,820,660 | B1 * | 11/2004 | Ludwig | B65G 35/08 141/89 |
| 7,914,726 | B2 * | 3/2011 | Andison | B29C 49/46 264/529 |
| 8,758,670 | B2 * | 6/2014 | Haesendonckx | B29C 49/78 425/141 |
| 8,777,604 | B2 * | 7/2014 | Senn | B29C 49/68 425/526 |
| 8,806,840 | B2 * | 8/2014 | Bierschneider | B67C 3/007 53/77 |
| 10,196,253 | B2 * | 2/2019 | Clüsserath | B67C 7/0046 |
| 10,285,217 | B2 * | 5/2019 | Schoenberger | B29C 49/4205 |
| 11,426,920 | B2 * | 8/2022 | Kitzinger | B29C 49/783 |
| 2007/0220835 | A1 * | 9/2007 | Till | B29C 49/42107 53/167 |
| 2009/0277135 | A1 * | 11/2009 | Mastio | B67C 3/242 53/283 |
| 2011/0012032 | A1 * | 1/2011 | Bufano | A61L 2/087 250/492.3 |
| 2011/0037187 | A1 | 2/2011 | Winzinger et al. | 264/39 |
| 2011/0146202 | A1 * | 6/2011 | Imatani | B29B 11/12 425/525 |
| 2011/0286899 | A1 * | 11/2011 | Martini | B01D 46/0012 55/385.2 |
| 2011/0287126 | A1 | 11/2011 | Geltinger et al. | 425/522 |
| 2012/0266567 | A1 * | 10/2012 | Haesendonckx | B29C 49/783 53/558 |
| 2013/0061557 | A1 * | 3/2013 | Kitano | B29C 49/06 53/167 |
| 2013/0160405 | A1 * | 6/2013 | Preckel | B05D 3/06 427/532 |
| 2014/0157726 | A1 * | 6/2014 | Clusserath | B65B 5/02 53/574 |
| 2014/0196415 | A1 * | 7/2014 | Drenguis | B67C 3/001 53/493 |
| 2014/0311095 | A1 * | 10/2014 | Hayakawa | A61L 2/208 53/167 |
| 2015/0069271 | A1 * | 3/2015 | Soellner | B65G 29/00 250/492.3 |
| 2016/0194189 | A1 * | 7/2016 | Zoni | B67C 3/225 141/37 |
| 2016/0257055 | A1 * | 9/2016 | Hayakawa | A61L 2/06 |
| 2017/0015540 | A1 * | 1/2017 | Zoni | B67C 3/26 |
| 2019/0071259 | A1 * | 3/2019 | Bauer | B65C 9/02 |
| 2020/0024118 | A1 * | 1/2020 | Hayakawa | A61L 2/07 |
| 2020/0048064 | A1 * | 2/2020 | Hayakawa | A61L 2/186 |
| 2020/0087131 | A1 * | 3/2020 | Melrose | B65B 55/025 |
| 2020/0268917 | A1 * | 8/2020 | Hayakawa | B67C 7/0073 |
| 2021/0122583 | A1 * | 4/2021 | Hahn | B67C 7/002 |
| 2022/0008573 | A1 * | 1/2022 | Bernard | A61L 2/087 |
| 2022/0212911 | A1 * | 7/2022 | Hayakawa | B65B 55/10 |
| 2023/0202771 | A1 * | 6/2023 | Neubauer | B65G 47/24 198/434 |
| 2023/0202819 | A1 * | 6/2023 | Neubauer | A61L 2/00 53/426 |
| 2023/0202820 | A1 * | 6/2023 | Gette | B67C 3/242 53/426 |

OTHER PUBLICATIONS

European Search Report issued in related Appln. Serial No. 23164998.9, dated Nov. 2, 2023, with machine English translation, 19 pages.

\* cited by examiner

SYSTEM AND METHOD FOR OPERATING A SYSTEM FOR PRODUCING FILLED PLASTIC CONTAINERS FROM STERILE PLASTIC PREFORMS

BACKGROUND OF THE INVENTION

The present invention relates to a system and to a method for operating a system for producing filled plastic containers, in particular filled beverage containers, from sterile plastic preforms. Such systems and methods for operating such a system have long been known from the prior art.

Such systems usually have a forming apparatus for forming the sterilized plastic preforms into plastic containers, which apparatus has a transport carrier which can be moved, and in particular rotated, about a central axis. A plurality of forming stations each for forming a plastic preform into a plastic container by applying a flowable medium is usually arranged on the transport carrier.

Filling material, in particular beverages, can only be filled into a container produced in this way once the container, in particular its interior, is in a sterile state. For the sterilization of the containers, in particular their interior (or inner wall), a sterilization apparatus is therefore usually provided. The filling process is usually performed by means of a filling apparatus for filling the plastic containers during their at least sectional transport substantially along a circular line about a central axis of the filling apparatus.

From the prior art, systems and methods for operating such a system are known, in which the already fully formed containers are not sterilized before the filling process, but instead the not yet formed plastic preforms are sterilized. The advantage of this procedure is that the plastic preforms have a significantly smaller surface area than the (fully formed) plastic containers. This enables a noticeably lower energy and media consumption. In addition, the preform or the plastic preform still has no undercuts like the fully blown bottle. Sterilizing medium can thus more easily reach all places.

The systems and the methods for operating the systems that are currently known from the prior art have the disadvantage that the systems require a large installation space. For example, a system is known from the internal prior art of the applicant, in which the central axis of the forming apparatus has a distance of more than 9 m from a central axis of the filling apparatus for systems with a forming apparatus with 24 forming stations.

The object of the present invention is to overcome the disadvantages known from the prior art and to provide a system as well as a method for operating a system, which requires less installation space or which has a comparatively smaller footprint. This can advantageously achieve a cost and space saving.

SUMMARY OF THE INVENTION

A system according to the invention for producing filled plastic containers from plastic preforms which are sterilized, in particular by means of a sterilization apparatus for sterilizing at least one inner wall and/or outer wall of the plastic preforms, has a transport device for transporting the plastic preforms and plastic containers produced from the plastic preforms by forming, along a (fixedly) predetermined transport path through the system.

The containers are preferably beverage containers and/or plastic or polyethylene terephthalate (PET) containers. The containers are preferably bottles.

Preferably, the transport device is suitable and intended for at least sectionally transporting the plastic preforms and/or plastic containers during their movement through the system. The transport device is preferably suitable and intended for completely transporting (in particular without interruptions) the plastic preforms and plastic containers produced therefrom, in the entire system. In this case, the transport device in particular has several different transport units, such as at least one and preferably a plurality of transport star-wheel(s) and/or supply starwheel(s) and/or pitch delay starwheel(s). In other words, the transport device is preferably designed in multiple parts (from a plurality of transport units), wherein the plastic preforms or the plastic containers are transferred from one transport unit to the next.

The system has (at least and preferably exactly) one forming apparatus for forming the sterilized plastic preforms into (fully formed) plastic containers. The term "plastic container" (or also "container") is used below in particular with respect to plastic containers that are fully formed from the plastic preforms (by means of the forming apparatus).

The transport device is suitable and intended for supplying the sterilized plastic preforms to the forming apparatus, for example via an infeed starwheel.

The forming apparatus has a transport carrier which can be moved about a central axis and in particular rotated (about the central axis) and on which is arranged a plurality of forming stations each for forming a plastic preform into a plastic container by applying a flowable medium. During their forming (i.e., while they are each separately arranged in one of the plurality of forming stations), the plastic preforms are preferably transported at least sectionally about the central axis of the forming apparatus and substantially (at least sectionally) along a circular line.

The plastic preforms are preferably fed separately (successively) to the forming apparatus. Each forming station can receive exactly one plastic preform to be formed.

The (common) (transport) carrier on which the plurality of forming stations is arranged is in particular a rotatable carrier and in particular a blowing wheel. The forming stations, in particular the blowing stations, each have a blow-molding device, which preferably form a cavity within which the plastic preforms can be expanded to form the plastic containers.

The blow-molding devices are preferably designed in multiple parts and preferably have two blow mold halves and a bottom mold. These blow mold halves are preferably detachably arranged on a mold carrier shell or on the blow mold carriers. The blow mold carriers are pivotable relative to one another in order to open and close the blow-molding devices. In addition, the blow mold carrier has locking mechanisms in order to lock the mold halves against one another during the blowing process.

The forming apparatus for forming plastic preforms into plastic containers is preferably a blow-molding machine (and/or a mold-filling machine). This means that the plastic preforms are first thermally conditioned in a heating section by means of a heating apparatus and subsequently expanded by applying a liquid or gaseous medium (preferably compressed air) in a forming station, in particular a blowing station. The flowable medium is preferably under pressure. For supplying the pressurized medium, the apparatus preferably has a blowing nozzle, which can be sealingly applied to an aperture and/or inside an aperture and/or to a carrying ring of the plastic preforms and/or to a blow mold (device) in order to thus expand the plastic preforms with a liquid or gaseous medium. In other words, the blowing nozzle can seal at the aperture, but also on the carrying ring or on the blow mold, or also inside the aperture. In addition, a valve arrangement is preferably also provided which controls the supplying of the blowing air to the plastic preforms.

For their forming process, the plastic preforms are preferably applied with different pressure levels, preferably corresponding to a predetermined and preferably variable pressure curve. For example, it is known that the plastic preforms are first applied with a pre-blowing pressure, then with at least one intermediate blowing pressure and finally also with a final blowing pressure.

The system has a filling apparatus for filling the plastic containers during their at least sectional transport substantially along a circular line about a central axis of the filling apparatus. In other words, the containers are transported within or in the region of the filling apparatus at least sectionally along a circular line, wherein the center point of this circular line represents a central axis of the filling apparatus, which is in particular located in a central region of the filling apparatus. Preferably, the filling apparatus has a carrier which can be moved and preferably rotated (about the central axis) and which transports the plastic containers, in particular separately, preferably at least sectionally along the circular line. The section of the circular line along which the plastic containers are moved extends preferably over a central angle of more than 180°, preferably more than 200°, particularly preferably more than 270°.

The filling apparatus preferably has a plurality of filling members, wherein a filling member can be brought into fluid connection with a plastic container (transported at least sectionally along the circular line) to be filled in the filling apparatus, and the plastic container can be filled by this filling member, or the filling member and the filling apparatus are suitable and intended for filling the plastic container to be filled which is located in the filling apparatus (with a predetermined filling material, such as a beverage).

According to the invention, the forming apparatus and the filling apparatus have a maximum distance from one another in relation to their respective central axes
of 5.5 m, preferably of 5.3 m, and the forming apparatus has a maximum number of 24 forming stations or
of 6.0 m, preferably of 5.6 m, and the forming apparatus has more than 24 forming stations.

Preferably or alternatively, the forming apparatus and the filling apparatus have a maximum distance from one another in relation to their respective central axes
of 5.5 m, preferably of 5.3 m, in the case of a forming apparatus with a maximum number of 24 forming stations and/or
of 6.0 m, preferably of 5.6 m, in the case of a forming apparatus with more than 24 forming stations.

This advantageously results in a very small footprint of the system.

In other words, in the case of a system with a forming apparatus having a maximum number of 24 forming stations, the forming apparatus is a maximum of 5.5 m, preferably a maximum of 5.3 m, away from the filling apparatus, in a view of the central axis of the forming apparatus and the central axis of the filling apparatus.

For example, the distance between the forming apparatus and the filling apparatus in the case of a system with up to 16 forming stations could be in a range between 3 m and 5 m, preferably between 4.5 m and 1.8 m.

In the case of a system with a forming apparatus having more than 24 forming stations (preferably between 25 and 30 forming stations and particularly preferably between 26 and 30 forming stations), the forming apparatus is a maximum of 6.0 m, preferably a maximum of 5.6 m, away from the filling apparatus, in a view of the central axis of the forming apparatus and the central axis of the filling apparatus.

For example, the distance between the forming apparatus and the filling apparatus in the case of a system comprising up to 24 forming stations could be in a range between 4.5 m and 6 m, preferably between 5 m and 5.8 m and particularly preferably between 5.2 m and 5.6 m.

In an advantageous embodiment, the system has a sterilization apparatus for sterilizing at least one inner wall (preferably a substantially and particularly preferably an entire total inner surface) and/or an outer wall of a plastic preform to be formed. In this case, the sterilization apparatus is suitable and intended for inactivating microorganisms and/or spores on the inner wall of the plastic preform to be formed. This offers the advantage mentioned at the outset that a smaller (inner) surface of the plastic preforms must be sterilized in comparison to the fully formed plastic container, and energy and media resources can thereby be saved.

It is also conceivable that the sterilization apparatus (or a further sterilization apparatus) is provided (in particular as part of the system) which is suitable and intended to sterilize (in addition to the inner wall) an outer wall or an outer surface of the plastic preform at least in regions, in particular to inactivate microorganisms and/or spores at least in regions on the outer wall (preferably the entire outer surface) and preferably the entire surface (i.e., inner and outer surface) of the plastic preform to be formed. It is conceivable, for example, that (only) an aperture region and/or a threaded region and/or a holding ring is sterilized so that recontamination of the sterilized inner wall region by a non-sterilized outer wall region can be prevented.

For sterilization, the sterilization apparatus can be suitable and intended to use liquid hydrogen peroxide and/or a mixture of hot air and gaseous or vaporous hydrogen peroxide (in the gas phase and/or in the liquid phase) and/or sprayed concentrated hydrogen peroxide (with the aid of preferably spray nozzles and/or ultrasonic atomization).

It is conceivable, for example, that spores are inactivated with a 35% hydrogen peroxide solution and with air saturated with water and hydrogen peroxide vapor (air saturated with hydrogen peroxide vapor with a concentration of $H_2O_2$ in g/100 g of dry air of at least 0.0228, preferably at least 0.0478, preferably at least 0.1002, preferably at least 0.1710, preferably at least preferably at least 0.7397) at a treatment temperature of at least 60'C.

The sterilization apparatus is preferably arranged directly upstream of the forming apparatus so that no further treatment unit for treating the plastic preforms (except for transporting them) is arranged between the forming apparatus and the sterilization apparatus. The sterilization apparatus is preferably arranged between a heating apparatus and the forming apparatus. However, it would also be conceivable for the sterilization apparatus to be arranged upstream of the furnace or a/the heating apparatus or in the furnace or in a/the heating apparatus.

Preferably, the sterilization apparatus(es) for sterilizing the plastic preform only uses/use one sterilizing medium and preferably $H_2O_2$. Further sterilization and/or disinfection methods are preferably no longer necessary in a heating device for heating the plastic preforms before they are formed in the forming apparatus. However, it is also conceivable that the sterilization apparatus is arranged upstream of the heating device and/or within the heating device.

It is conceivable that UV lamps are used for a disinfection and/or sterilization process and/or an inactivation process. It is also conceivable that an inactivation effect is caused by the fact that a disinfection agent which is applied to the plastic preform to be sterilized is irradiated with hot air and/or IR radiation. In particular, it is also conceivable for the sterilization apparatus to be suitable and intended to carry out a thermal inactivation of microorganisms by means of IR treatment and/or heat.

It is also conceivable that for sterilization (by the sterilization apparatus(es)), a chemical thermal sterilization is carried out, in which a sterilizing agent (e.g., peracetic acid or hydrogen peroxide) is sprayed at an elevated temperature and/or at an elevated temperature of the plastic preforms and/or is preferably removed by means of sterile water or hot air after an exposure time.

The sterilization apparatus(es) is/are preferably suitable and intended to reduce the number of living individuals (in the sterilized region) by at least six powers of ten ($10^{-6}$). In particular, the sterilization apparatus is suitable and intended to carry out such a sterilization of a respective region to be sterilized that the residual content of reproductive microorganisms in one unit of the sterilized product is at most $10^{-6}$.

In a preferred embodiment, the forming apparatus for forming plastic preforms into plastic containers has at least one sterilization maintenance apparatus which is suitable and intended for maintaining a predetermined degree of sterilization and/or degree of purity of the inner wall of the plastic preforms to be formed and/or of the at least partially formed plastic preforms. The applicant has found that the maximum distances specified above can be realized despite such a sterilization maintenance apparatus requiring installation space.

The sterilization maintenance apparatus could in this case be configured (purely) mechanically, for example as an enclosure or housing of the forming apparatus (which enclosure/housing in particular extends over the entire periphery), by means of which enclosure/housing particles and dust from an outer non-sterile surrounding region (e.g., the production hall) are kept out of or shielded from the interior of the housing or enclosure. In addition, at least one position within the housing of the forming apparatus and/or at a supply opening in the forming apparatus, sterilizing agent (such as $H_2O_2$) is supplied, preferably continuously, and applied to the plastic preforms to be formed (in particular before the forming stations are closed).

The sterilization maintenance apparatus is preferably suitable and intended to keep the sterilized regions of the plastic preform or of a plastic container produced therefrom at a predetermined degree of sterilization and/or degree of purity of the inner wall and/or the outer wall (in particular the entire inner surface and/or the entire outer surface), which corresponds to at least a reduction in the germ number by at least 3 powers of ten, preferably at least 4 powers of ten, more preferably at least 5 powers of ten and particularly preferably at least 6 powers of ten in comparison to a corresponding non-sterilized region of the inner wall of the plastic preform or plastic container. This predetermined degree of sterilization and/or degree of purity is preferably maintained during the forming process and particularly preferably in the entire forming apparatus (in particular by means of the sterilization maintenance apparatus).

The sterilization maintenance apparatus is preferably realized by providing a clean room (described in more detail below), which preferably has a degree of sterilization and/or a degree of purity at which a reduction of reproductive microorganisms (killing and/or irreversible inactivation) by at least 6 powers of ten preferably compared to the non-sterile surrounding region. The number of living individuals (in particular on and/or at the sterilized regions of the plastic preforms to be formed) is preferably reduced by at least six powers of ten in the clean room (i.e., to one millionth, $10^{-6}$) (in comparison to the corresponding regions of the plastic preform in a non-sterile surrounding region) so that the residual content of reproductive microorganisms in one unit of the sterilized product is preferably at most $10^{-6}$.

In a preferred embodiment, the system can be operated in a sterilization operation and in a production operation different therefrom. Preferably, the sterilization operation differs from the production operation in that in the sterilization operation, a sterilizing medium is supplied to a supply line of flowable medium provided for forming. This offers the advantage that continuous supplying of sterilizing medium is not required and that, in particular, the production operation needs to be interrupted and the forming apparatus needs to be sterilized only if the forming apparatus is converted, so that sterilizing medium can be used in a resource-saving manner.

Preferably, the forming apparatus has a stationary part and a rotating part, wherein fluid medium, which is used to carry out the forming process for the expansion of the plastic preforms by applying the fluid medium to them, is supplied from the stationary part of the forming apparatus into the rotating part of the forming apparatus via a rotary distribution apparatus. Preferably, at least one (air) filter is provided for reducing the germ count and/or air filtration in the fluid medium in the rotating part of the apparatus and/or in an annular channel for (temporarily) storing the fluid medium.

Preferably, in the sterilization operation, a valve for the supply line of the fluid medium is opened, which valve is preferably arranged in the stationary part of the forming apparatus, and sterilizing agent for sterilizing the supply lines and/or the blow-molding devices and/or the blowing nozzle is supplied therethrough. Preferably, the sterilizing agent used is $H_2O_2$ (in particular in gaseous form) and/or moist heat (vapor sterilization; for example, super-heated, saturated water vapor 121° C./15 min. 134° C./3 min holding time) and/or dry heat (hot air sterilization; for example, moving hot air, approximately 180° C./30 min exposure time) and/or a physicochemical low-temperature method (for example, by means of ethylene oxide and/or formaldehyde water vapor and/or via plasma sterilization).

In the production operation, sterilizing agent is preferably not supplied continuously to the interior and/or to the supply lines for fluid medium (which is used or to be used for the expansion or forming of the plastic containers).

Preferably, sterilizing medium is conducted into the insulator (of the forming apparatus) via openings in an insulator wall (of an insulator of the forming apparatus) in the sterilization operation. In the sterilization operation, sterilizing medium is preferably supplied or conducted via openings in an outer wall of the forming apparatus, which separates an interior of the forming apparatus (in particular a clean room) from an external environment of the forming apparatus (in particular in an airtight manner), into the interior of the forming apparatus (in particular into the clean room).

In a further advantageous embodiment, filtered air is supplied via the supply line in the production operation and in particular air that is HEPA-filtered and/or filtered by means of suspended matter filters (preferably high-efficiency particulate filters (EPA=efficient particulate air) or HEPA (acronym for high-efficiency particulate air/arrestance) and/or high-efficiency suspended matter filters (ULPA, abbreviation for ultra-low penetration air)) is supplied for forming the plastic preforms.

Preferably, the forming apparatus is a sterile forming apparatus.

In a preferred embodiment, the blow mold side parts are each arranged on a first mold carrier and a second mold carrier, which can be moved relative to a pivot axis for opening and/or closing. The blow mold side parts are preferably exchangeably arranged on the mold carriers. Preferably, the bottom part is also arranged, in particular exchangeably, on a bottom part carrier.

In a further preferred embodiment, an opening and/or closing movement of the first mold carrier takes place by a first angle and an opening and/or closing movement of the second mold carrier takes place by a second angle, wherein the first angle and the second angle are substantially identical.

Accordingly, the two mold carriers preferably carry out an identical movement. The two mold carriers are accordingly preferably designed or arranged so as to be movable. This is in particular advantageous since less space is required for the opening movement as a result. The opening and/or closing movement of the mold carriers thus also contributes to the forming stations being able to be arranged closer to one another and the diameter of the transport carrier thus being able to be reduced.

Preferably, the mold carriers are arranged or mounted on a stationary pivot axis or pivot shaft and can be moved relative thereto. The pivot axis preferably (mechanically) connects the two mold carriers to one another. Advantageously, both mold carriers rotate relative to a stationary bearing axis of the pivot axis by the substantially identical angle. Bearing elements in the form of sealed rolling bearings or sliding bearings are preferably arranged between the bearing axis and the mold carriers.

Particularly preferably, the opening and closing movement of the mold carriers takes place mirror-invertedly about a geometric axis of symmetry. The opening and closing movement of the mold carriers is preferably a pivoting movement and in particular a pivoting movement by a predetermined angle.

The movement of the mold carriers is preferably controlled via at least one guide cam. The opening of the mold carriers preferably serves in particular to insert a plastic preform into the blow-molding device and, after forming, to be able to remove a formed plastic container from the blow-molding device again. Opening of the mold carriers is also necessary for exchanging the blow mold parts, such as the blow mold side parts and the bottom part. The opening and closing of the mold carriers is therefore preferably performed in particular or predetermined angular ranges of the transport carrier.

The opening and/or closing movement of the first mold carrier by a first angle and the opening and/or closing movement of the second mold carrier by a second angle being substantially identical means that the opening and/or closing movement of the first mold carrier by the first angle and the opening and/or closing movement of the second mold carrier by the second angle deviate from one another by no more than 3° to 10°, preferably by no more than 2° to 7°, and particularly preferably by no more th an 1° to 5° The opening angle between the two mold carriers is preferably between 0° and 150°.

In a preferred embodiment, the system has a clean room and/or sterile room, which is delimited by several walls and within which the plastic preforms are expanded to form the plastic containers. The forming apparatus preferably has a sealing apparatus in order to seal the clean room from a non-sterile environment. In particular, this sealing device prevents non-sterile ambient air and germs from entering the clean room and contaminating it. This offers the advantage that a risk of recontamination of the sterilized plastic preforms which are supplied to the forming apparatus can be kept as low as possible by the clean room conditions.

In other words, the blow-molding machine or the (transport) carrier and the blow mold arrangements are particularly preferably arranged within a clean room which delimits the blow-molding machine from a non-sterile environment. Drive devices for closing, locking and/or opening the blow molds are preferably arranged outside the clean room.

The blow-molding devices are preferably transported within the clean room. Preferably, the clean room is delimited by at least one standing wall and one wall that moves relative to this standing wall. In this case, for example, the transport carrier on which the blow-molding devices are arranged can already have or form one of these walls and in particular the moving wall. Advantageously, the clean room is designed in the manner of a ring or torus around the blowing stations or forming stations and/or the transport path of the plastic containers.

In a further preferred embodiment, the sealing device has at least one circumferential channel which can be filled with a liquid and into which a circumferential wall projects, wherein this wall is preferably at least one blade and particularly preferably exactly one blade. It is accordingly proposed to use a so called water lock for sealing the clean room, and in particular a single water lock, which has exactly one blade, which dips into the flowable medium and thus separates a non-sterile region from the sterile region. By using a single water lock, in contrast to a double water lock, a smaller footprint of the system can likewise be made possible since this requires less space.

In particular, the sealing device preferably has a single water lock which has exactly one blade which dips into a circumferential channel filled with a liquid and thus separates a non-sterile region from the sterile region.

The circumferential wall of the sealing device is preferably designed to be rotatable relative to the channel. Preferably, the rotating movement of this wall is coupled to the rotating movement of the transport carrier. This wall is thus preferably a circulating blade which forms a component of the water lock or the hydraulic seal. Particularly preferably, this wall dips into the liquid located in the channel. Conversely, it would also be conceivable for the channel to be rotatable and the circumferential wall to be designed to be stationary.

The circumferential channel is preferably divided by the circumferential wall of the sealing device into a radially inner channel section and a radially outer channel section, wherein the blade preferably dips into the liquid in a region between the inner channel section and the outer channel section.

In an advantageous embodiment, in a section of the transport path between the forming apparatus and the filling apparatus, the transport device has at least three transport units with a transport carrier, such as transport starwheels and/or pitch delay starwheels and/or supply starwheels, which can be moved, in particular rotated, about a respective central axes. The realization of a small footprint of a system is, inter alia, also influenced by the fact that a sufficiently long transport path between the forming apparatus and the filling apparatus must be provided so that during transport path, the already fully formed plastic containers can cool down and/or cure sufficiently until they are filled so that a high quality of the filling product and of the filled container can be ensured.

The forming apparatus and/or the filling apparatus is preferably designed as a carousel-type machine which, having the plurality of forming stations or blowing stations, preferably transports the blow-molding devices (in the case of the forming apparatus) and the filling members (in the case of the filling apparatus) about the respective central axis along a circular line.

After the completion of forming or expansion, the finished plastic containers are removed, from the forming apparatus of the plastic preforms into plastic containers, by a removal device for receiving the plastic containers, which can be designed as a rotatable transport starwheel, in particular as a pitch delay starwheel.

In a preferred embodiment, the system has a ventilation apparatus for regulating at least one predetermined property variable of an atmosphere prevailing in the region of the forming of the plastic preforms into plastic containers, wherein the property variable is characteristic of a physical variable, such as an air pressure and/or an air temperature and/or an air humidity and/or an air density, a flow rate, and/or a physicochemical variable, such as a variable characteristic of an air composition, and/or of an air purity variable, such as a degree of purity and/or a degree of sterilization. In a plan view of the system, the ventilation apparatus is arranged between the forming apparatus and the filling apparatus. Such ventilation apparatuses offer the advantage that the above-described predetermined degree of purity and/or degree of sterilization can be maintained. Thus, for example, in the forming apparatus, a positive pressure can prevail in comparison to the environment (outside an enclosure or housing) so that essentially no air flows from the outer surrounding region into the housing interior of the forming apparatus. Furthermore, fresh and/or pure and/or filtered air can be supplied steadily or continuously so that a targeted flow direction can be realized.

Such ventilation apparatuses also require a comparatively large installation space. The ventilation apparatus is preferably arranged above the forming apparatus and in particular laterally above the forming apparatus. The term "laterally" is to be understood here to mean, in particular, that the ventilation apparatus is arranged in its entirety between the forming apparatus and the filling apparatus (in each case in relation to the central axes thereof). In a plan view of the system, the ventilation apparatus preferably does not extend beyond an edge region of the forming apparatus opposite the filling apparatus. In a plan view of the system, the ventilation apparatus preferably does not extend beyond the filling apparatus. In a plan view of the system, the ventilation apparatus is particularly preferably arranged in such a way that there is no overlap with the filling apparatus. This is advantageous since the filling apparatus itself requires a plurality of media inlets and/or outlets, which are preferably arranged above the filling apparatus.

The ventilation apparatus preferably provides the fluid medium used for forming the plastic preforms, in particular the blowing air, which is applied to the plastic preforms in order to expand them. Additionally or alternatively, the ventilation apparatus (in particular of the forming apparatus) preferably provides control air, which is in particular used for controlling various (in particular pneumatic) elements (of the forming apparatus), and/or sterile air.

In particular, the system can be arranged in a corner arrangement of the system or in a linear arrangement of the system and have the above-specified maximum values for the distance between the forming apparatus and the filling apparatus (as seen in relation to the central axes thereof) both in the corner arrangement and in the linear arrangement. A corner arrangement of the system can preferably be present.

A corner arrangement of the system is to be understood in particular as an arrangement in which a main container-transport direction encloses an angle greater than 15°, preferably greater than 20° and particularly preferably greater than 28° with a connection direction which extends substantially from the central axis of the forming apparatus to the central axis of the filling apparatus.

If, in relation to a process angle of the forming apparatus, a zero angle is defined as an angular position that is (substantially) exactly (central) between a supply device (such as a feed starwheel), which supplies the plastic preforms to be formed to the forming apparatus, and a discharge device, which discharges the fully formed plastic preforms from the forming apparatus, the main container-transport direction is preferably understood to mean a 270° direction in relation to this zero angle (counter-clockwise measurement). This is illustrated in the figures.

A main container-transport direction is in particular a connection direction from a center of gravity and/or a center point and/or a central axis of a supply device, in particular a supply starwheel of the forming apparatus, and a center of gravity and/or a center point and/or a central axis of a discharge device, which discharges the fully formed containers from the forming apparatus. If the treatment units, such as the forming apparatus, are not considered, the containers are transported about a connecting line (along the connection direction) from the supply starwheel or the supply apparatus to the discharge apparatus (or along a circular line around the latter).

A linear arrangement of the system is to be understood in particular as an arrangement in which a main container-transport direction encloses an angle not greater than 10°, preferably not greater than 8° and particularly preferably not greater than 5° with a connection direction which extends substantially from the central axis of the forming apparatus to the central axis of the filling apparatus.

In a preferred embodiment, in the case of a corner arrangement of the system with a forming apparatus, preferably with a forming apparatus with a maximum number of 24 forming stations, the forming apparatus and the filling apparatus have a maximum distance of 4.5 m, preferably of 4.2 m and particularly preferably of 4.05 m from one another in relation to the respective central axes thereof. An even smaller distance between the filling apparatus and the forming apparatus can thus be realized with a corner arrangement. It is also conceivable that a system which is present or arranged in a corner arrangement has more than 24, e.g., 30, forming stations.

In a preferred embodiment, in the case of a corner arrangement of the system with a forming apparatus comprising a maximum number of 16 forming stations, the forming apparatus and the filling apparatus have a maximum distance of 4 m, preferably of 3.8 m and particularly preferably of 3.5 m from one another in relation to the respective central axes thereof. An even smaller distance between the filling apparatus and the forming apparatus can thus be realized with a corner arrangement in the case of forming apparatuses with smaller maximum numbers of forming stations.

Preferably, in the case of forming apparatuses with 4 to 16 forming stations, a diameter of the transport carrier is smaller than 2 m. Particularly preferably, the plurality of forming stations, which is selected from a number of 4 to 16 forming stations, is in this case arranged on a transport carrier with a diameter of greater than or equal to 0.5 m and less than or equal to 2 m.

Preferably, in the case of forming apparatuses with 17 to 35 forming stations, a diameter of the transport carrier is smaller than 3 m. Particularly preferably, the plurality of forming stations, which is selected from a number of forming stations between 17 to 35 forming stations, is in this case arranged on a transport carrier with a diameter of greater than or equal to 2.1 m and less than or equal to 3 m.

It is thus preferably proposed to increase the number of forming stations on a transport carrier or to arrange more forming stations than before on a smaller transport carrier. As a result, in comparison with the blow-molding machines known hitherto from the prior art of the applicant, a smaller footprint or space requirement of the system and a closer proximity of the forming apparatus to the filling apparatus (in relation to their central axes) can also be achieved. In the prior art, the (pitch circle) diameter of the transport carrier is very high in relation to the number of forming stations arranged on the transport carrier. For example, it is known from the internal prior art of the applicant that only 12 to 16 forming stations are arranged on a transport carrier with a diameter of 2.3 m and 20 to 24 forming stations in the case of a diameter of 3.4 m.

The individual forming stations arranged on the transport carrier preferably each have a distance of between 0.05 m and 1 m, preferably between m and 0.8 m and particularly preferably between 0.07 m and 0.5 m relative to one another. In the case of a diameter of the transport carrier of less than 2 m, the individual forming stations particularly preferably have a distance of between 0.08 m and 0.6 m, preferably between 0.1 m and 0.5 m relative to one another, or in the case of a diameter of the transport carrier of less than 3 m, a distance of between 0.05 m and 0.2 m, preferably 0.07 m and 0.18 m relative to one another. The exact distance of the forming stations from one another is dependent on the exact diameter of the transport carrier and the number of forming stations. For example, the distance between the individual forming stations in a transport carrier with a diameter of 1.7 m and with 14 forming stations is approximately 0.12 m and in a transport carrier with a diameter of 2.3 m and with 22 forming stations is approximately 0.1 m. In this way, more forming stations can be arranged on comparatively smaller diameters, as a result of which the forming apparatus can advantageously be arranged more closely to the filling apparatus.

A ratio between a diameter of the transport carrier and a number of the forming stations is preferably less than 0.14, preferably less than 0.13 and particularly preferably less than 0.12. These ratios are advantageous since an optimal ratio between the number of forming stations and the size of the transport carrier is thus made possible in order to select them as small as possible and to thus reduce the space requirement. By maintaining these ratios, multiple stations can thus be arranged on a smaller platform or a smaller transport carrier. In this way too, the extension of the forming apparatus can be reduced for a predetermined number of forming stations, as a result of which the central axes of the forming apparatus and of the filling apparatus can be arranged more closely to one another.

A ratio between a diameter of the transport carrier and a number of the forming stations is preferably greater than 0.35, preferably greater than 0.2. A ratio between a diameter of the transport carrier and a number of the forming stations is particularly preferably less than 0.14 or greater than 0.2.

In a preferred embodiment, a forming station has a station capacity of between 2500 and 2800 plastic containers per hour. In other words, between 2500 and 2800 plastic containers can be formed per hour with one forming station.

In a further, preferred embodiment, the apparatus has a system capacity of between 10,000 and 85,000 plastic containers per hour. The system capacity is in particular dependent on the number of forming stations of the apparatus.

The blow-molding machine is preferably a stretch blow-molding machine, which means that the preforms are stretched in the longitudinal direction before and/or during expansion by means of a stretching device, in particular a rod-shaped body, e.g., a stretching rod. The forming stations, in particular the blowing stations, each have stretching devices, in particular rod-shaped bodies, e.g., stretching rods, which can be inserted into the plastic preforms and expand the plastic preforms in their longitudinal direction. The stretching devices, in particular the rod-shaped bodies, e.g., the stretching rods, preferably have an electric drive.

In an advantageous embodiment, the forming apparatus for forming plastic preforms into plastic containers, and preferably each forming station, in particular each blowing station, has a temperature control device which is suitable and intended for controlling the temperature of parts of the blow-molding device, in particular for heating parts of the blow-molding device. This heating preferably takes place by means of electrical energy or by means of a flowable and in particular liquid temperature control medium. For example, hot oil or water can be used to control the temperature of the side parts of the blow mold and/or the bottom part of the blow mold. This temperature control can take place by means of channels arranged in the blow mold itself and/or also by means of channels arranged in blow mold shells and/or also in a blow mold carrier.

In an advantageous embodiment, the system has at least one heating apparatus which heats or warms preforms, injection molding apparatuses, in particular for producing the (plastic) preforms, labeling units for labeling the filled (plastic) containers, (further) sterilization units, closing device(s) for closing the filled plastic containers, or the like. A combination of individual or several of these apparatuses or units in the system is also preferred.

The system preferably has an injection molding apparatus (in particular for producing the plastic preforms). The entire path between the injection molding apparatus and the filling apparatus and/or a closing apparatus (which closes the containers filled by the filling apparatus) is preferably kept sterile and/or is part of the clean room. In particular, in the case of a system with an injection molding apparatus, the entire path between injection molding and closing is kept sterile.

Preferably, the heating apparatus for heating plastic preforms in the transport direction of the plastic preforms is arranged upstream of the forming apparatus for forming the plastic preforms into plastic containers.

In this case, the plastic preforms to be heated are preferably introduced into the heating apparatus via an insertion device. They are transported therein by means of the transport device along a predetermined transport path through the heating apparatus. A plurality of heating boxes or heating elements, by means of which the plastic preforms are heated in particular according to a predetermined temperature profile, is arranged in the heating apparatus, in particular on rectilinear transport sections. The temperature profile can be variable in the longitudinal direction of a plastic preform.

After passing through the heating apparatus, preferably by means of a transport device, which can be designed as a transport starwheel and which has receiving elements for receiving the plastic preforms, the plastic preforms are transported to the apparatus for forming the plastic preforms into plastic containers and are introduced into an (open) blow-molding device.

The present invention is furthermore directed to an arrangement of a filling apparatus relative to a forming apparatus in a system for producing filled plastic containers from plastic preforms which are sterilized, in particular by means of a sterilization apparatus for sterilizing at least one inner wall and/or outer wall of the plastic preforms. In this case, the system has a transport device for transporting the plastic preforms and plastic containers produced from the plastic preforms by forming, along a predetermined transport path through the system.

Furthermore, the system has the forming apparatus for forming the sterilized plastic preforms into plastic containers, wherein the transport device is suitable and intended to supply the sterilized plastic preforms to the forming apparatus, wherein the forming apparatus has a transport carrier which can be moved, in particular rotated, about a central axis and on which a plurality of forming stations each for forming a plastic preform into a plastic container by applying a flowable medium is arranged.

In this case, the system has the filling apparatus for filling the plastic containers during their at least sectional transport substantially along a circular line about a central axis of the filling apparatus.

According to the invention, an arrangement of the forming apparatus and of the filling apparatus is such that they have a maximum distance from one another in relation to their respective central axes
of 5.5 m, preferably of 5.3 m, and the forming apparatus has a maximum number of 24 forming stations or
of 6.0 m, preferably of 5.6 m, and the forming apparatus has more than 24 forming stations.

Preferred is an arrangement of the forming apparatus and of the filling apparatus such that they have a maximum distance from one another in relation to their respective central axes
of 5.5 m, preferably 5.3 m, in the case of a forming apparatus with a maximum number of 24 forming stations and/or
of 6.0 m, preferably of 5.6 m, in the case of a forming apparatus with more than 24 forming stations.

The system may be equipped with any of the features described above in the context of the system, individually or in combination with one another.

The present invention is furthermore directed to a method for operating a system for producing filled plastic containers from plastic preforms which are sterilized, in particular by means of a sterilization apparatus for sterilizing at least one inner wall and/or outer wall of the plastic preforms. The system has a transport device which transports the plastic preforms as well as plastic containers produced from the plastic preforms by forming, along a predetermined transport path through the system.

The system (to be operated) furthermore has a forming apparatus, which forms the sterilized plastic preforms into plastic containers, wherein the transport device supplies the sterilized plastic preforms to the forming apparatus, wherein the forming apparatus has a transport carrier which can be moved, in particular rotated, about a central axis and on which a plurality of forming stations each for forming a plastic preform into a plastic container by applying a flowable medium is arranged.

The system (to be operated) has a filling apparatus for filling the plastic containers during their at least sectional transport substantially along a circular line about a central axis of the filling apparatus.

According to the invention, the forming apparatus and the filling apparatus have a maximum distance from one another in relation to their respective central axes
of 5.5 m, preferably of 5.3 m, and the forming apparatus has a maximum number of 24 forming stations
or
of 6.0 m, preferably of 5.6 m, and the forming apparatus has more than 24 forming stations.

Preferably, the forming apparatus and the filling apparatus have a maximum distance from one another in relation to their respective central axes
of 5.5 m, preferably of 5.3 m, in the case of a forming apparatus (8) with a maximum number of 24 forming stations and/or
of 6.0 m, preferably of 5.6 m, in the case of a forming apparatus (8) with more than 24 forming stations.

It is thus also proposed within the scope of the method according to the invention that a space-saving design is realized by a maximum distance between the forming apparatus and the filling apparatus.

In this case, the above-described system is, in particular, set up and provided to carry out this described method or to be operated, which means that all features designed for the system described above are also disclosed for the method described herein, and vice versa. In addition, in a preferred method for operating the system, the method steps that have been described above in the context of the system as suitability features for execution ("suitable and/or intended") are carried out individually or in combination with one another.

BRIEF DESCRIPTION OF THE FIGURES

Further advantages and embodiments can be seen in the accompanying drawings.

In the drawings.

DETAILED DESCRIPTION OF THE INVENTION

Figure 1:
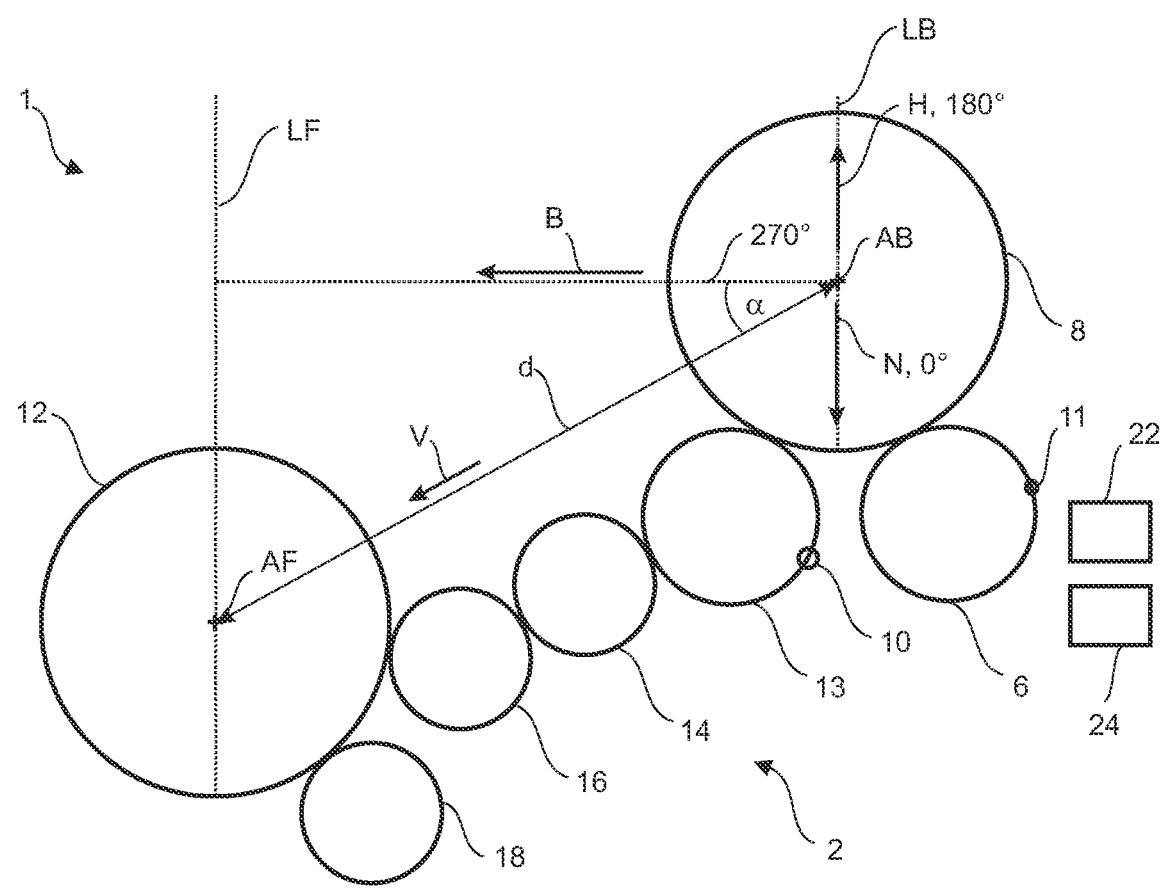
FIG. 1 shows a schematic representation of a system according to the invention for producing filled plastic containers, according to a preferred embodiment in a corner arrangement.

FIG. 1 shows a schematic representation of a system 1 according to the invention for producing filled plastic containers 10, according to a preferred embodiment in a corner arrangement.

Plastic preforms 11 are preferably heated, before they are supplied to a forming apparatus 8, by means of a heating apparatus 24, which is shown schematically here, and (in any case an in particular entire inner wall region, and preferably an in particular entire outer wall region, and/or aperture region) are sterilized by means of a sterilization apparatus 22, which is also shown schematically here.

A supply device 6, for example a supply starwheel, supplies the plastic preforms to be formed to the forming apparatus 8, in which they are transported at least sectionally along a circular line (shown) about the central axis AB, while a fluid medium is applied to them within a forming station and they are thereby expanded. Finally, after the forming process has taken place, they are discharged from the forming apparatus by a discharge device 13, preferably a pitch delay starwheel.

The reference sign N denotes, as the reference direction, a 0° process angle of the forming apparatus, which indicates a (central) (angular) position between the supply position of the plastic preforms and the discharge position of the plastic containers. A direction perpendicular thereto (270°) is referred to or defined as the main container-transport direction B. This direction indicates the main movement direction in which the plastic preforms (then as containers) are transported further, essentially to the next treatment apparatus (disregarding their basic annular transport).

Via at least one and preferably via a plurality of transport starwheels 14 (of the transport device 2), the plastic container is transferred to a supply device (e.g., pitch delay starwheel) 16, which in turn transfers the plastic container to be filled to the filling apparatus 12. In the filling apparatus, the plastic containers to be filled are transported about a central axis AF in particular (at least sectionally) along a circular line.

The reference sign V denotes the connection direction between the central axis AB of the forming apparatus 8 and the central axis AF of the filling apparatus 12.

The distance d between the central axis AB of the forming apparatus 8 and the central axis AF of the filling apparatus 12 is at most 5.5 m, preferably at most 5.3 m, in the case of a forming apparatus 8 with a maximum number of 24 forming stations and/or at most 6.0 m, preferably at most 5.6 m, in the case of a forming apparatus 8 with more than 24 forming stations.

FIG. 1 shows a preferred corner arrangement, which is characterized in that the angle α, which the main container-transport direction B encloses with the connection direction V, is greater than 15°, preferably greater than 20° and particularly preferably greater than 28°.

The reference sign 18 denotes a discharge device (e.g., a discharge starwheel) for discharging the filled plastic containers from the filling apparatus 12.

Figure 2:
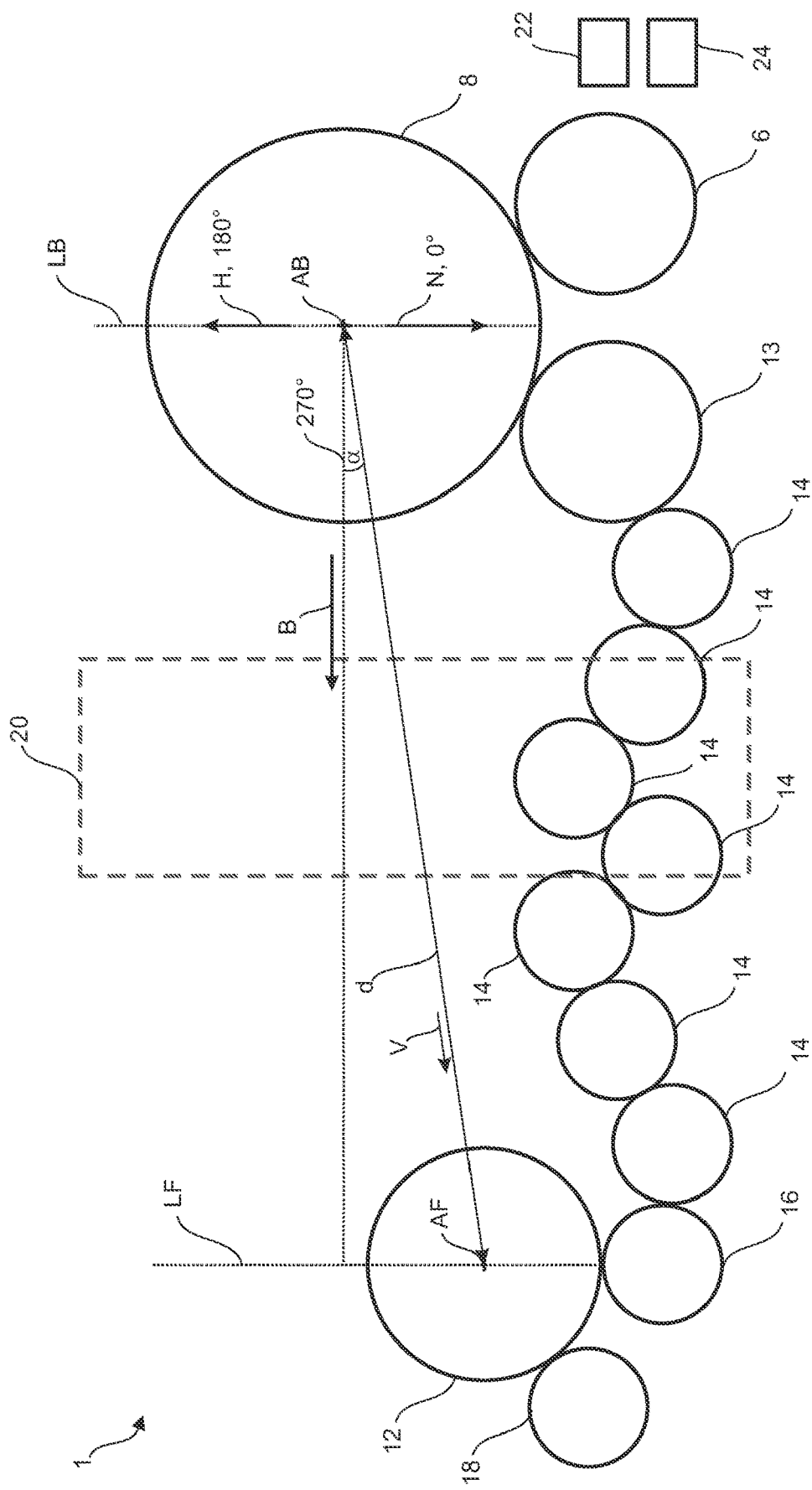
FIG. 2 shows a schematic representation of a system according to the invention for producing filled plastic containers, according to a preferred embodiment in a linear arrangement.

FIG. 2 shows a schematic representation of a system 1 according to the invention for producing filled plastic containers 10, according to a preferred embodiment in a preferred linear arrangement (in contrast to the corner arrangement in FIG. 1). Identical reference signs denote identical or identically acting elements or apparatuses or variables.

A linear arrangement of the system 1 is to be understood in particular as an arrangement in which the main container-transport direction B encloses an angle not greater than 10°, preferably not greater than 8° and particularly preferably not greater than 5° with a connection direction V.

The reference sign 20 furthermore denotes a schematic representation of a ventilation apparatus (in particular ventilation device) which is arranged between the forming apparatus 8 and the filling apparatus 12 (as viewed in the connection direction V).

In contrast to the system 1 shown in FIG. 1, the system 1 shown in FIG. 2 has a transport device 2 with a plurality of (here 7) transport units 14 between the discharge device 13 and the supply device 16.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS

1 system
2 transport device
8 forming apparatus
10 plastic container
11 plastic preform
13 discharge device
14 transport starwheel
16 supply device
20 ventilation apparatus, ventilation device
22 sterilization apparatus
24 heating apparatus
AB central axis of forming apparatus
AF central axis AF
B main transport direction
N zero angle
V connection direction

The invention claimed is:

1. A system for producing filled plastic containers from sterilized plastic preforms, comprising a transport device for transporting the plastic preforms and plastic containers produced from the plastic preforms by forming, along a predetermined transport path through the system, comprising a forming apparatus for forming the sterilized plastic preforms into plastic containers, wherein the transport device is suitable and intended for supplying the sterilized plastic preforms to the forming apparatus, wherein the forming apparatus has a transport carrier which can be moved about a central axis and on which a plurality of forming stations each for forming a plastic preform into a plastic container by applying a flowable medium is arranged, comprising a filling apparatus for filling the plastic containers during their at least sectional transport substantially along a circular line about a central axis of the filling apparatus, wherein
the forming apparatus and the filling apparatus have a maximum distance from one another in relation to their respective central axes
of 5.5 m and the forming apparatus has a maximum number of 24 forming stations or
of 6.0 m and the forming apparatus has more than 24 forming stations.

2. The system according to claim 1,
wherein
the system has a sterilization apparatus for sterilizing at least one inner wall and/or outer wall of a plastic preform to be formed, wherein the sterilization apparatus is configured for inactivating microorganisms and/or spores on the inner wall and/or outer wall of the plastic preform to be formed.

3. The system according to claim 1,
wherein the forming apparatus for forming plastic preforms into plastic containers has at least one sterilization maintenance apparatus which is configured for maintaining a predetermined degree of sterilization and/or degree of purity of the inner wall of the plastic preforms to be formed and/or of the at least partially formed plastic preforms.

4. The system according to claim 1,
wherein
the system can be operated in a sterilization operation and in a production operation different therefrom, wherein the sterilization operation differs from the production operation in that in the sterilization operation, a sterilizing medium is supplied to a supply line of flowable medium provided for forming.

5. The system according to claim 4,
wherein
in the production operation, filtered air is supplied via the supply line for forming the plastic preforms.

6. The system according to claim 1,
wherein
an opening and/or closing movement of a first mold carrier takes place by a first angle and an opening and/or closing movement of a second mold carrier takes place by a second angle, wherein the first angle and the second angle are substantially identical.

7. The system according to claim 1,
wherein
the system has a clean room which is delimited by several walls and within which the plastic preforms are expanded to form the plastic containers, and in that the forming apparatus has a sealing apparatus in order to seal the clean room from a non-sterile environment.

8. The system according to claim 7,
wherein
the sealing device has a single water lock, which has exactly one blade, which dips into a circumferential channel filled with a liquid and thus separates a non-sterile region from the sterile region.

9. The system according to claim 1,
wherein
a corner arrangement of the system is present in which a main container-transport direction encloses an angle greater than 10° with a connection direction which extends substantially from the central axis of the forming apparatus to the central axis of the filling apparatus.

10. The system according to claim 1,
wherein
the forming station has a station capacity of between 2500 and 2800 plastic containers per hour.

11. The system according to claim 1,
wherein
the system has a system capacity of between 10,000 and 85,000 plastic containers per hour.

12. The system according to claim 1,
wherein
in a section of the transport path between the forming apparatus and the filling apparatus, the transport device has at least three transport units with a transport carrier, such as transport starwheels and/or pitch delay starwheels, which can be moved about respective central axes.

13. The system according to claim 1,
wherein
the forming apparatus and/or the filling apparatus is/are designed as a carousel-type machine.

14. The system according to claim 1,
wherein
the system has a ventilation apparatus for regulating at least one predetermined property variable of an atmosphere prevailing in the region of the forming of the plastic preforms into plastic containers, wherein the property variable is characteristic of a physical variable, such as an air pressure and/or an air temperature and/or an air humidity and/or an air density, a flow rate, and/or a physicochemical variable, such as a variable characteristic of an air composition, and/or of an air purity variable, such as a degree of purity and/or a degree of sterilization, and wherein, in a plan view of the system, the ventilation apparatus is arranged between the forming apparatus and the filling apparatus.

15. A method for operating a system for producing filled plastic containers from sterilized plastic preforms, comprising a transport device, which transports the plastic preforms and plastic containers produced from the plastic preforms by forming, along a predetermined transport path through the system, comprising a forming apparatus, which forms the sterilized plastic preforms into plastic containers, wherein the transport device supplies the sterilized plastic preforms to the forming apparatus, wherein the forming apparatus has a transport carrier which can be moved about a central axis and on which a plurality of forming stations each for forming a plastic preform into a plastic container by applying a flowable medium is arranged, comprising a filling apparatus for filling the plastic containers during their at least sectional transport substantially along a circular line about a central axis of the filling apparatus,
wherein
the forming apparatus and the filling apparatus have a maximum distance from one another in relation to their respective central axes
of 5.5 m and the forming apparatus has a maximum number of 24 forming stations or
of 6.0 m and the forming apparatus has more than 24 forming stations.

* * * * *